United States Patent
Selander et al.

(10) Patent No.: US 9,690,929 B2
(45) Date of Patent: Jun. 27, 2017

(54) METHOD, APPARATUS AND COMPUTER PROGRAM PRODUCT FOR DETERMINING PASSWORD STRENGTH

(71) Applicant: TELEFONAKTIEBOLAGET L M ERICSSON (PUBL), Stockholm (SE)

(72) Inventors: Göran Selander, Bromma (SE); Mats Näslund, Bromma (SE); Freyr Saevarsson, Reykjavik (IS)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 67 days.

(21) Appl. No.: 14/401,701

(22) PCT Filed: Sep. 20, 2012

(86) PCT No.: PCT/SE2012/050993
§ 371 (c)(1),
(2) Date: Nov. 17, 2014

(87) PCT Pub. No.: WO2013/176593
PCT Pub. Date: Nov. 28, 2013

(65) Prior Publication Data
US 2015/0143509 A1 May 21, 2015

Related U.S. Application Data

(60) Provisional application No. 61/650,167, filed on May 22, 2012.

(51) Int. Cl.
*G06F 7/04* (2006.01)
*G06F 21/46* (2013.01)
(Continued)

(52) U.S. Cl.
CPC .............. *G06F 21/46* (2013.01); *G06F 21/36* (2013.01)

(58) Field of Classification Search
CPC .......... G06F 21/46; G06F 21/36; G06F 21/31; G06F 21/577; G06F 2203/04104;
(Continued)

(56) References Cited

U.S. PATENT DOCUMENTS 8,539,550 B1 * 9/2013 Terres ...................... G06F 21/31
726/16
8,769,607 B1 * 7/2014 Jerdonek ................. G06F 21/31
726/1
(Continued)

OTHER PUBLICATIONS

Authors et al. "Complexity check for drawn image authenitcation" An ip.com Prior Art Database Technical Disclosure Aug. 15, 2011, 4 pages.
(Continued)

*Primary Examiner* — Gary Gracia
(74) *Attorney, Agent, or Firm* — Rothwell, Figg, Ernst & Manbeck, P.C.

(57) ABSTRACT

A method for estimating the strength of a graphical password comprising two or more segments is disclosed. In some embodiments, this advantageous solution is achieved by implementing a multi-step process. In one step, the data processing system applies a first operation on a first segment to produce a transformed segment. In another step, the data processing system performs a comparison operation between the transformed segment and a second segment. In another step, the data processing system performs a penalty operation with respect to the first segment based on an outcome of the comparison operation. The penalty operation includes one or more of (1) calculating a penalty value, wherein the penalty value may be used in calculating a value representing the strength of the graphical password; and (2) disregarding the first or the second segment when calculating the value representing the strength of the graphical password.

29 Claims, 10 Drawing Sheets

(51) Int. Cl.
  *G06F 21/36* (2013.01)
  *G06F 12/14* (2006.01)
(58) Field of Classification Search
  CPC .... G06F 3/0416; G06F 3/0421; G06F 3/0488;
             G06F 3/017; H04L 9/3226
  USPC .......................................... 726/18; 715/863
  See application file for complete search history.

(56) References Cited

U.S. PATENT DOCUMENTS

| | | | | |
|---|---|---|---|---|
| 2004/0139331 | A1* | 7/2004 | Sanai | G06F 21/46 713/184 |
| 2008/0165955 | A1* | 7/2008 | Ibrahim | G06F 7/725 380/30 |
| 2008/0184360 | A1* | 7/2008 | Kornilovsky | G06F 3/0362 726/17 |
| 2009/0244020 | A1* | 10/2009 | Sjolin | G06F 3/04883 345/173 |
| 2009/0313696 | A1* | 12/2009 | Himberger | G06F 21/46 726/22 |
| 2009/0320123 | A1* | 12/2009 | Yu | G06F 21/316 726/16 |
| 2010/0037306 | A1* | 2/2010 | Jan | G06F 21/36 726/7 |
| 2010/0040293 | A1* | 2/2010 | Hermann | G06F 21/31 382/218 |
| 2011/0004928 | A1* | 1/2011 | Won | G06F 21/36 726/7 |
| 2011/0034158 | A1* | 2/2011 | Bradley | G06Q 10/10 455/418 |
| 2011/0197259 | A1* | 8/2011 | Thibadeau | G06F 21/36 726/2 |
| 2011/0283353 | A1* | 11/2011 | Maetz | G06F 21/36 726/18 |
| 2012/0066650 | A1* | 3/2012 | Tirpak | G06F 21/46 715/863 |
| 2012/0102008 | A1* | 4/2012 | Kaariainen | G06Q 30/0201 707/705 |
| 2012/0102551 | A1* | 4/2012 | Bidare | G06F 21/36 726/4 |
| 2012/0167199 | A1* | 6/2012 | Riddiford | G06F 3/04842 726/16 |
| 2012/0272288 | A1* | 10/2012 | Ashbrook | G06F 21/32 726/1 |
| 2013/0002601 | A1* | 1/2013 | McCracken | G06F 3/0416 345/174 |
| 2013/0014248 | A1* | 1/2013 | McLaughlin | H04L 63/083 726/17 |
| 2013/0111581 | A1* | 5/2013 | Griffin | G06F 21/31 726/19 |
| 2014/0181956 | A1* | 6/2014 | Ahn | G06F 21/46 726/18 |
| 2014/0320457 | A1* | 10/2014 | Chen | G06F 3/0416 345/175 |

OTHER PUBLICATIONS

Guerra-Casanova, J. et al. "A robustness verification system for mobile phone authentication based on gestures using Linear Discriminant Analysis" Nature and Biologically Inspired Computing (NABIC), IEEE, 2011, pp. 157-162.

P.C. Van Oorschot et al. "On the security of graphical password schemes" Technical Report TR-05-11. Integration and Extension of Usenix Security 2004 and ACSAC 2004 Papers 2005, 41 pages.

Supplementary European Search Report issued in European application No. 12877511.1 dated Dec. 9, 2015, 9 pages.

* cited by examiner

US 9,690,929 B2

METHOD, APPARATUS AND COMPUTER PROGRAM PRODUCT FOR DETERMINING PASSWORD STRENGTH

CROSS REFERENCE TO RELATED APPLICATION(S)

This application is a 35 U.S.C. §371 National Phase Entry Application from PCT/SE2012/050993, filed Sep. 20, 2012, designating the United States, and also claims the benefit of U.S. Provisional Application No. 61/650,167, filed May 22, 2012. The disclosures of both applications are incorporated herein in their entirety by reference.

TECHNICAL FIELD

The disclosure relates to methods, apparatus, and computer program products for estimating the strength of a graphical password created by a user.

BACKGROUND

Many computer-based services today require a user to create a user account before the user may access the service. Commonly, in order to create a user account, the user must select a unique username and password. Typically the password is a text based password (i.e., a string of characters). To prevent an unauthorized person from utilizing the user's account, it is recommended that the user select a "strong" password (i.e., a password that is resistant to guessing or brute-force attack, such as a high entropy password). Generally, the "strength" of a password (i.e., the probability that the password will be hacked or the degree to which the password is susceptible to being hacked) is a function of its length, complexity, and unpredictability.

Because computers are becoming increasingly more powerful, short passwords are susceptible to brute-force attacks. Thus, many computer-based services require its users to select lengthypasswords (e.g., passwords that are at least eight characters long). Additionally, such computer based services also have rules regarding acceptable passwords, which rules are designed to ensure that users select complex passwords. For example, some services not only requires that the password be at least eight characters long, but may also require that: (i) the password contain a certain number of uppercase letters, numbers, and/or special characters (e.g., !, $, @, #) and (ii) the password not contain character repetitions. The longer and more complex a password is, however, the harder it is for a user to remember his or her password. Methods currently exists for estimating the strength of text-based passwords. Such methods may, for example, estimate the strength of a test-based password by, among other things, determining the length of the password and/or determining the number of special characters that the password contains.

An alternative solution to text-based passwords are graphical passwords. A service that uses graphical passwords for authentication rather than text-based passwords typically prompts its users to select a pattern as opposed to selecting a string of characters. The pattern then becomes the user's password. Graphical passwords are advantageous because the human brain seems more capable of remembering patterns than character strings. Much like the length and complexity of a text-based password, the more complex the pattern, the stronger the graphical password will be, however it is difficult to state rules regarding acceptable graphical passwords.

There is a need, therefore, to estimate the strength of graphical passwords.

SUMMARY

Particular embodiments of the disclosed solution provide a method, apparatus and computer program product for estimating the strength of a graphical password. In some embodiments, this advantageous solution is achieved by implementing a multi-step method. In some embodiments, the method includes applying a first operation on a first segment of the graphical password to produce a first transformed segment. The method also includes performing a comparison operation between the first transformed segment and a second segment of the graphical password. The method further includes performing a penalty operation with respect to the first segment, based on an outcome of the comparison operation. The step of performing the penalty operation may comprise one or more of: (i) calculating a penalty value, wherein the penalty value is used in calculating a value representing the strength of the graphical password; and (ii) disregarding the first or the second segment (e.g., ignoring the first or second segment) when calculating the value representing the strength of the graphical password.

Advantageously, in this manner, a data processing system can estimate the strength of a graphical password without having to store or access a dictionary of shapes. This ability may allow an apparatus to estimate the strength of a graphical password without requiring the apparatus to connect to a large dictionary of shapes through a wireless (or other) means of communication. In some embodiments, this ability may save battery power on an apparatus such as a mobile device. Another advantage is that the system may indicate to the user the estimated strength of a graphical password as the user is creating the graphical password.

In some embodiments, the method also includes determining whether the first transformed segment is similar to the second segment during the comparison operation.

The step of performing the comparison operation may include determining whether the first transformed segment is identical to the second segment, and the step of performing the penalty operation may be performed in response to a determination that the first transformed segment is identical to the second segment.

In another aspect, the solution provides a computer program product for estimating the strength of a graphical password comprising two or more segments, the computer program product includes a non-transient computer readable medium storing computer code. In some embodiments, the computer readable program code includes: (i) instructions for applying a first operation on a first segment of the graphical password to produce a first transformed segment; (ii) instructions for performing a comparison operation between the first transformed segment and a second segment of the graphical password; and (iii) instructions for performing a penalty operation with respect to the first segment based on an outcome of the comparison operation, wherein the instructions for performing the penalty operation comprises one or more of (a) instructions for calculating a penalty value, wherein the penalty value may be used in calculating a value representing the strength of the graphical password and (b) instructions for disregarding the first or the second segment when calculating the value representing the strength of the graphical password.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
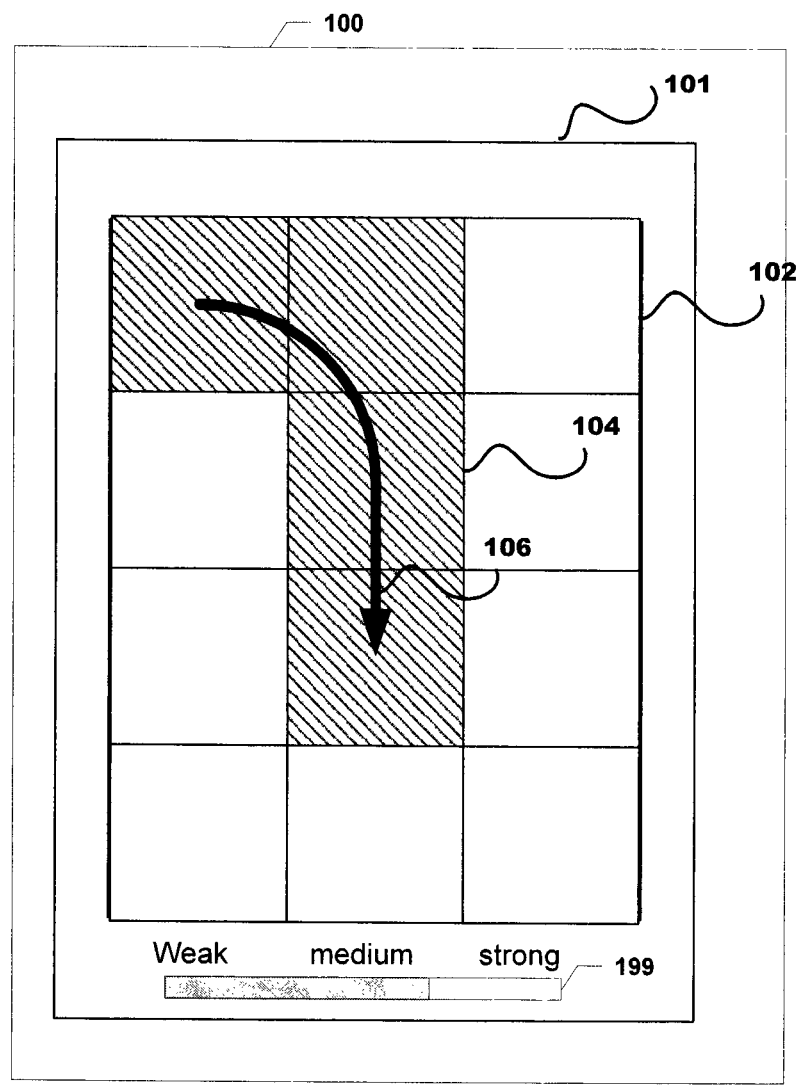
FIG. 1 is an example of a screen used to input a graphical password.

Referring now to FIG. 1, FIG. 1 is an example of a computer device 100 (e.g., mobile phone, tablet, laptop, PC) that is configured to prompt a user to create a graphical password (e.g., a pattern). The pattern may be a two-dimensional pattern, a three-dimensional pattern, or four-dimensional pattern. Device 100 includes a display screen 101, and, in this example, displayed on the display screen 101 is a display object 102 that the user may interact with to create a graphical password by creating a graphical pattern with respect to the display object 102. The graphical pattern that the user creates may be continuous or discontinuous. In some embodiments, the display screen is a touch screen and the user interacts with the display object 102 to create the graphical pattern by touching the touch screen. In other embodiments, the user may interact with the graphical object 102 using an input device other than a touch screen, such as, for example, a mouse, a joystick, a wand, a remote control, a microphone for receiving voice commands, a camera that tracks the user's eye movements, etc.

In the example shown, display object 102 is a two-dimensional grid 102 of points, where each point is represented by a different square shaped cell 104. The user may create a graphical pattern by selecting the displayed points (i.e., cells). The shaded cells 104 represent the graphical pattern that has been selected by the user to be part of the graphical password. The direction of the graphical pattern is shown in FIG. 1 by line 106 and, in this case, the user has created a continuous graphical pattern. The graphical pattern selected by the user is the secret used to authenticate the user (i.e., the graphical password), thus replacing the conventional, text based, password. That is, the authentication secret remembered by the end-user is the pattern or more specifically the gesture how the pattern was generated—a sequence of positions and actions relative to the figure. Depending on implementation, this pattern may be the shared secret between the user and for example the service provider or a local application, or the secret pattern may be converted/mapped to some other data structure that is used for authentication.

Figure 2A:
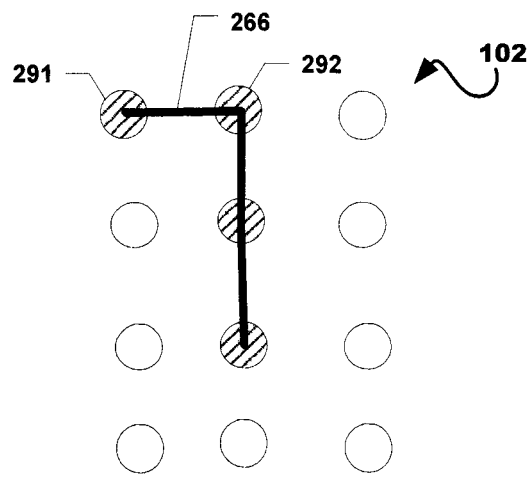
FIG. 2A is an example of a grid used to input a graphical password.
Figure 2B:
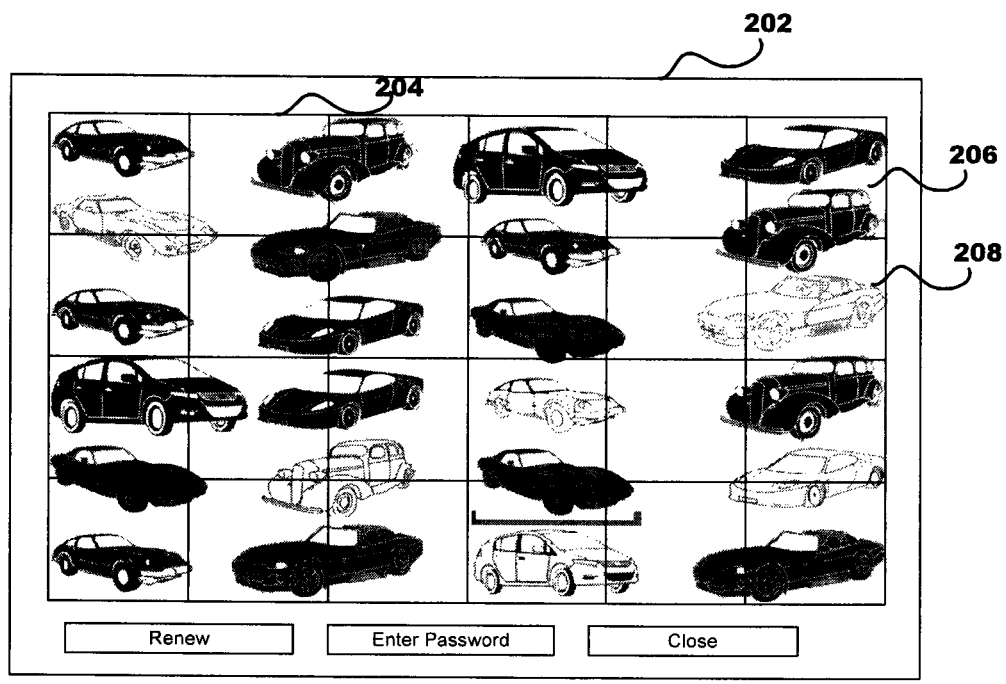
FIG. 2B is another example of a grid used to input a graphical password.

In other embodiments, instead of square cells 104, display object 102 may include a set of other shapes, such as for example small circles (see FIG. 2A) or cars (see FIG. 2B). As illustrated in FIG. 2A, when creating a graphical pattern, the user may not only select points, but also draw lines between points (see e.g., line 266 drawn between points 291 and 292).

Graphical object 102 may also be a photograph and, in some embodiments, a grid may overlay the photograph. Additionally, in some embodiments, display object 102 may incorporate more than two dimensions. For example, display object 102 may be a cube (or other three-dimensional object) with a grid on each side of the cube. In some embodiments, the display object 102 may not have x and y coordinates, but instead use shapes such as circles to delineate different areas of the object 102. For example, there may be circles of different sizes, each with the same center point. In some embodiments, display object 102 may not be displayed on screen 101, but may be part of an input device that is touch-sensitive without a display, such as a joystick or a graphics tablet such as a KoalaPad. In some embodiments, the graphical password may include a time element for the speed that the user selects portions of the display object 102. For example, the display object 102 may resemble a piano keyboard, and the user may input a song with each note being associated with a length of time.

Independently of how the user-generated graphical password is used for authentication, one factor contributing to the security of the password is the complexity of the user's selected graphical pattern, which we also refer to as the strength of the pattern. If the pattern is not complex, then it may be guessed more easily or may be more susceptible to a brute-force attack in the same way as weak passwords in a character string based authentication system.

In character string based password systems this problem is addressed by various policies for "allowed" passwords, e.g. required lengths of passwords, required character sets to use (e.g. upper/lower case, digits, special characters), and prohibited repetitions of characters. In addition to these policies, there are support tools for estimating the strength of a password as it is generated by the end-user, e.g. by using a "meter" indicating the strength of the password (e.g., a status bar of variable length with indications such as "weak", "medium", "strong" and/or variable color coding red, yellow and green, respectively). The strength is usually related to the policies: with additional characters, several character sets, and no repetition of characters giving a prolongation of the status bar. As an example of such a system one could give a score for the length, but then subtracting the number of repetitions.

For graphical pattern-based authentication, pattern policies may analogously include minimum length of the pattern (e.g., number of grid points selected) and analogous support tools for estimating the "strength" of the pattern may be presented to the user to give the user feedback regarding the strength of the user's proposed graphical password.

One technique that may be used to estimate the strength of a pattern is to perform a lookup in some dictionary to check if the chosen pattern is included in the dictionary and therefore easily predictable. Such a dictionary, however, would likely be very large, much larger than a common language dictionary. For example, a dictionary consisting of mirror symmetric patterns of length 14 on a 5×5 grid, corresponding to the entropy of ASCII password of length 10, has on the order of $10^{15}$ entries, compared to ordinary dictionaries which is of the order of $10^7$ entries. Also the use of a dictionary for evaluating the strength of a secret has impacts on the implementation of the client device where the password is entered, since such a dictionary may not be feasible to store locally due to its size, and the client device may not have access to network resources for accessing a dictionary remotely.

Another drawback of using a dictionary for providing feedback to the user on the selected secret is that it does not give as good user experience as the "meter" mentioned previously. The "meter" usually gives as feedback to the user a rating of the strength of the pattern so far and is gradually changing. In contrast, testing the secret against a dictionary essentially outputs "good" or "bad" in a more discontinuous fashion. Indeed, with dictionary lookups, the pattern could be classified as good right up to the very last finger movement which then suddenly renders the pattern bad.

In short, estimating the strength of a graphical password under creation by using a dictionary may not be an optimal solution. Accordingly, described herein are improved techniques for estimating the strength of a graphical password.

In some embodiments, for example, for each segment of a graphical password, a probability related value (e.g., an inverse of a probability value) associated with the segment is determined. The probability related value could for example be associated with the probability of the segment occurring at random (i.e. the uniform probability distribution). The determined probability related values may then be combined, e.g. multiplied, together to produce a value representing how unlikely the pattern is, which is an approximation for the strength of the password. As used herein, a "segment" of a graphical password may be any portion of the graphical password, such as, for example, a single point selected by the user, two or more points selected by the user, a straight line connecting a point selected by the user and the immediately next point selected by the user, or any line (a.k.a., "stroke") drawn by the user that is part of the user's graphical password.

In the general case, the user selected graphical pattern maybe continuous, but it may also consist of a number of disjoint strokes. A stroke is "disjoint" with another stroke if the two strokes share no point in common. For example, the user may create two disjoint strokes using a graphical object 102 displayed on a touch screen 101 by placing his/her finger on a first point of the graphical object 102, moving his/her finger from the first point to a second point of the graphical object 102, lifting the finger off the touch screen 101, placing his/her finger on the touch screen 101 again on a third point of the graphical object 102, moving his/her finger from the third point to a fourth point of the graphical object 102, and again lifting the finger off the touch screen 101. As an example, FIG. 7A shows a pattern comprising four strokes. As mentioned above, a segment of a user created graphical pattern may thus be defined in terms of the user's strokes, but is not limited thereto: any part of the user created pattern may be considered a segment of the pattern.

Figure 3:
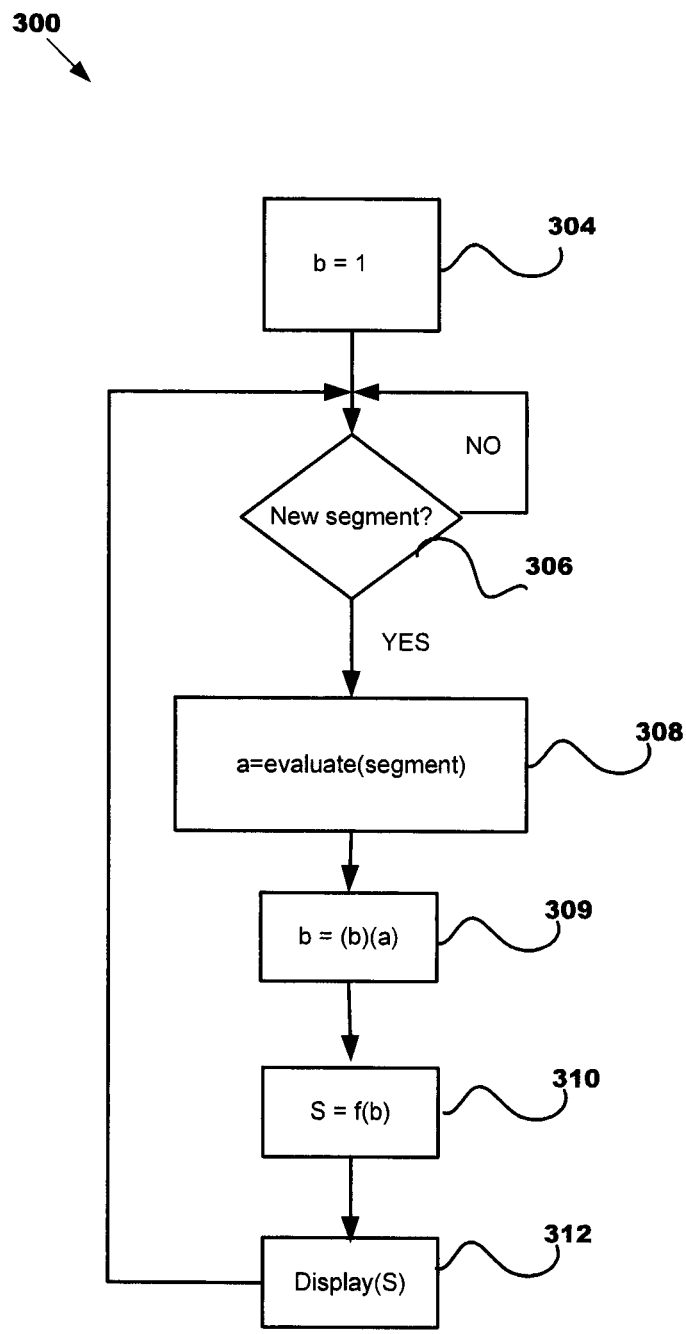
FIG. 3 is a flow chart illustrating a process for estimating the strength of a graphical password.

Referring now to FIG. 3, FIG. 3 is a flow chart that illustrates an example of a process 300 for estimating the strength of a graphical password in real time and providing, in real time, feedback to the user regarding the determined strength. Process 300 may be performed by apparatus 100.

Process 300 may begin with step 304, where apparatus 100 sets a variable "b" to an initial value (e.g., 1), wherein the variable b represents the strength of the graphical password. In step 306, apparatus 100 may determine whether the user has selected a new segment for the user's graphical password. If there is not a new segment, the process may return to step 306 until there is a new segment, otherwise process 300 proceeds to step 308.

In step 308, apparatus 100 may determine a value associated with the segment and sets a variable "a" equal to the determined value. For example, in step 308, apparatus 100 may determine, based on a probability distribution, a probability-related value, such as an inverse probability value. For instance, the probability related value may be a function of how probable the new segment is in relation to the previous segments entered.

In step 309, the product of the value of a and the value of b is determined and the variable b is then set equal to this product (i.e., b=a*b). In other embodiments, instead of determining the product of a and b, other mathematical operations may be performed (addition, subtraction, division). Accordingly, in general, in step 309 f(a,b) is determined (i.e., b=f(a,b)).

In step 310, a strength value (S) is determined based on the current value of b. In some embodiments, the possible set of values that S may equal is a limited set. For instance, in some embodiments, S is limited to on one of four values (e.g., "weak," "medium" "strong," and "very strong"). That is, depending on the value of b, the password may be assigned a particular strength label. In some embodiments, S is a function not only of b but also the length of the pattern (i.e., S=f(b,l)). For instance if the selected pattern comprises l stroke, S may be a function of: $b*((k-1)$ choose $(l-1))$, where the multiplicative factor$((k-1)$ choose $(l-1))$ is the total number of possible patterns of length k, having l strokes.

In step 312, the value S is displayed so that the user will have feedback as to the current strength of the password. For example, in step 312, a "password meter" status bar 199 (see FIG. 1) may be displayed, where the length of the bar indicates the estimated strength of the password. If the password is indicated as being weak, then the user may choose to add another segment (e.g., point or stroke) to the pattern, and thus, the process will repeat and a new strength value is estimated.

Figure 4:
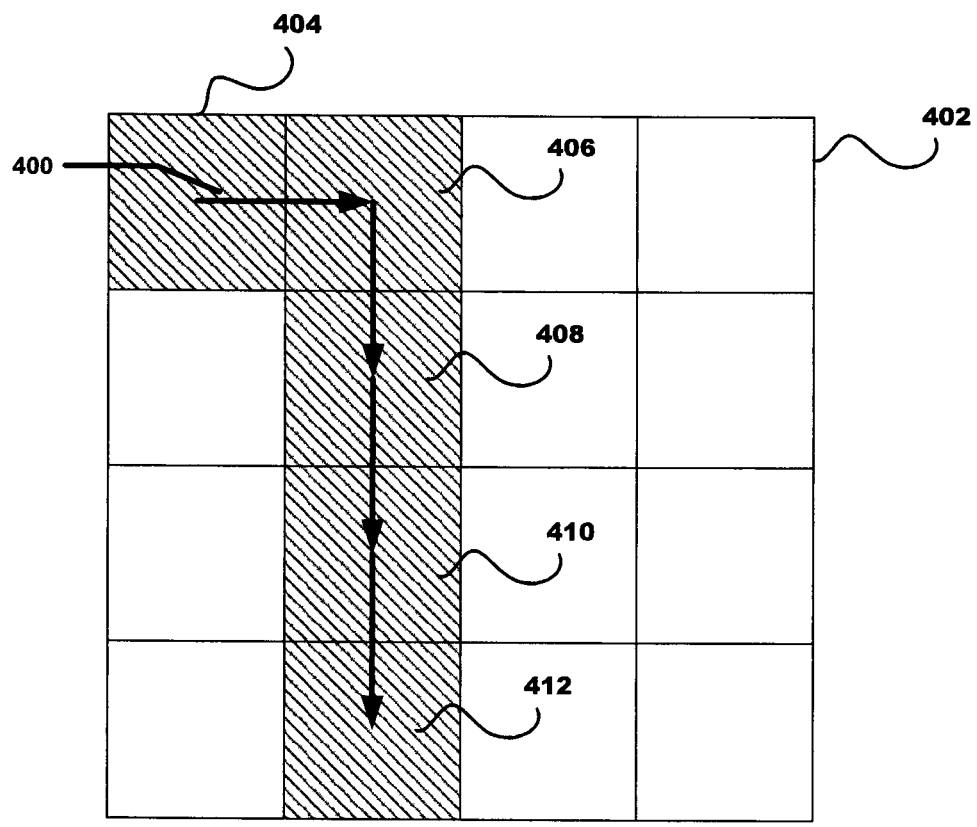
FIG. 4 shows an example graphical password.

Referring now to FIG. 4, in one embodiment, FIG. 4 shows an example graphical password 400 that was selected by a user interacting with grid 402. In FIG. 4, the grid 402 has 16 cells (or points). As shown in FIG. 4, the user has selected five unique cells in a certain order to form pattern 400. As described in process 300, the strength of the graphical password 400 may, in some embodiments, be evaluated in real-time each time the user selects a new cell of the grid. For example, the strength may initially be determined when the user selects the first cell of the pattern, which in this case is cell 404. As described above in connection with process 300, the process of estimating the strength may first include determining a probability related value associated with cell 404. In some embodiment, the probability-related value that is determined is the inverse probability of the likelihood that cell 404 would be the starting place. If we assume a uniform probability distribution, then the probability that cell 404 is selected as the starting point is 1/16. Thus, the inverse of this probability is 16. Hence, when steps 308-312 of process 300 are performed, the variable a is set to 16, the variable b=1*16 (i.e., 16), and the displayed strength (S) depends on the value of b.

When the user selects the next cell, which in this example is cell 406, steps 308-312 of process 300 are performed again. If we again assume a uniform probability distribution and assume that the user's newly selected cell is immediately adjacent to the immediately previously selected cell, then, when step 308 is performed this time, the variable "a" may be set to a value of 3 because the user has only three choices since the user previously selected cell 404, and the value "b" will be set to 48 (i.e., (3)(16)).

Using the above assumption and the assumption that backtracking is not allowed (e.g. according to requirements of the service provider), the next time steps 308-312 are performed (i.e., when the user selects the next cell (i.e., cell 408)), "a" will be set equal to 4 and "b" will be set to 192 (i.e., (4)(48)). Similarly, when the next cell is selected (i.e., cell 410), "a" will be set equal to 7 and "b" will be set to 1344 (i.e., (7)(192)). In some embodiments, however, a penalty is assessed if the user does not change the direction of the pattern. In the example of FIG. 4, the user did not change the direction of the pattern because cell 410 is aligned with cells 406 and 408 (i.e., a straight line connects cells 406-410). Thus, in embodiments where a penalty is assessed for not changing the direction of the pattern, "a" will not be set equal to seven, but rather to (7)(r), where r<1 (e.g., r=0.5).

When steps 308-312 are performed for the last time (i.e., the last cell is selected (i.e., cell 412)), "a" will be set equal to 7 (assuming no penalty is assessed) and "b" will be set equal to 9408 (i.e., 1344*7). In some embodiments, however, a penalty will be assessed because the user did not change the direction of the pattern. Because this is the second time in a row the user did not change the direction of the pattern, the penalty value r may be set equal to $r^2$. Thus, in some embodiments, when the user selects the last cell 412 "a" is set equal to $7*r^2$. Hence, in the embodiments where the penalty is assessed the ultimate value of "b" will be $9408*r^3$, rather than 9408. As the example illustrates, if the user does not change directions n times, then, in some embodiments, when the next b value is calculated the b value may be multiplied by $r^n$. The example also illustrates that the strength of the graphical password may be a number (e.g. 9408), such that the larger the number, the stronger the graphical password.

In the above example, a uniform probability distribution was assumed. That is, it was assumed that the probability of selecting anyone of the available cells is 1/x, where x is the number of available cells from which to choose. In other embodiments, the probability that a user would select a given cell from a set of available cells may be based on something other than a uniform probability distribution. For example, based on historical data, it may be observed that upper left hand corner cells is selected as the first cell more often than any other cell. Thus, probabilities may be determined based on prior user data or other distributions.

One aspect of human-drawn patterns is that patterns are often highly symmetric, which reduces the complexity (e.g., entropy) and makes them easier to guess. Accordingly, in some embodiments, including the above described embodiments, the symmetry or structure of the user's selected graphical pattern is taken into account when estimating the strength of the pattern. For example, penalties may be assessed if the user's graphical pattern is symmetrical in certain respects. More specifically, in some embodiments, geometric operations (or other operations) are used to transform a user's graphical pattern (or segments thereof) to produce a transformed pattern. The transformed pattern is then compared with the user's original pattern to determine the similarity between the original pattern and the transformed pattern. The similarities between the original pattern and the transformed pattern provide an indication of the symmetry of the original pattern. Because a symmetrical pattern indicates less randomness of the pattern, which makes it weaker, penalties may be assessed if the user's proposed pattern is found to be symmetrical (or partially symmetrical).

The operations that may be used to test the symmetry of a pattern include, but are not limited to: reflections with respect to certain lines, surfaces or points; rotations by certain angles with respect to certain points; scaling of patterns, either enlarging or diminishing, linearly or non-linearly (the latter refers to whether the same scale-factor is applied to all parts of the pattern or if some parts of the pattern are scaled with one factor and other parts with another factor; other linear transformations such as shear; translations/shifts by a certain distance in certain directions; wrapping over edges of the grid so that a (shifted) pattern reaching the grid boundary in one edge/corner continues in another edge/corner; combinations of some or all of the above operations (e.g., performing a set of operations in sequence).

Figure 5:
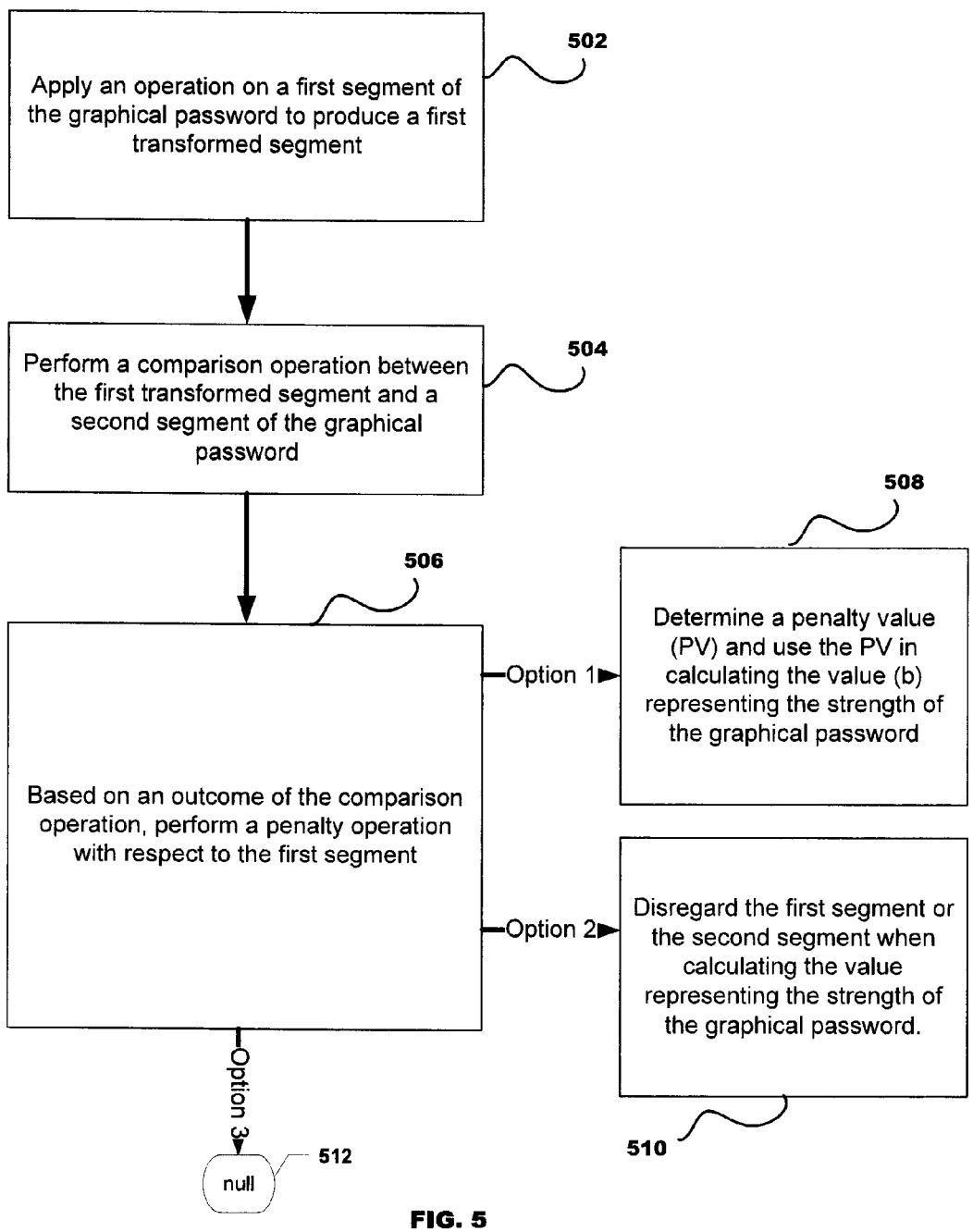
FIG. 5 is a flow chart illustrating a process for estimating the strength of a graphical password.
Figure 6:
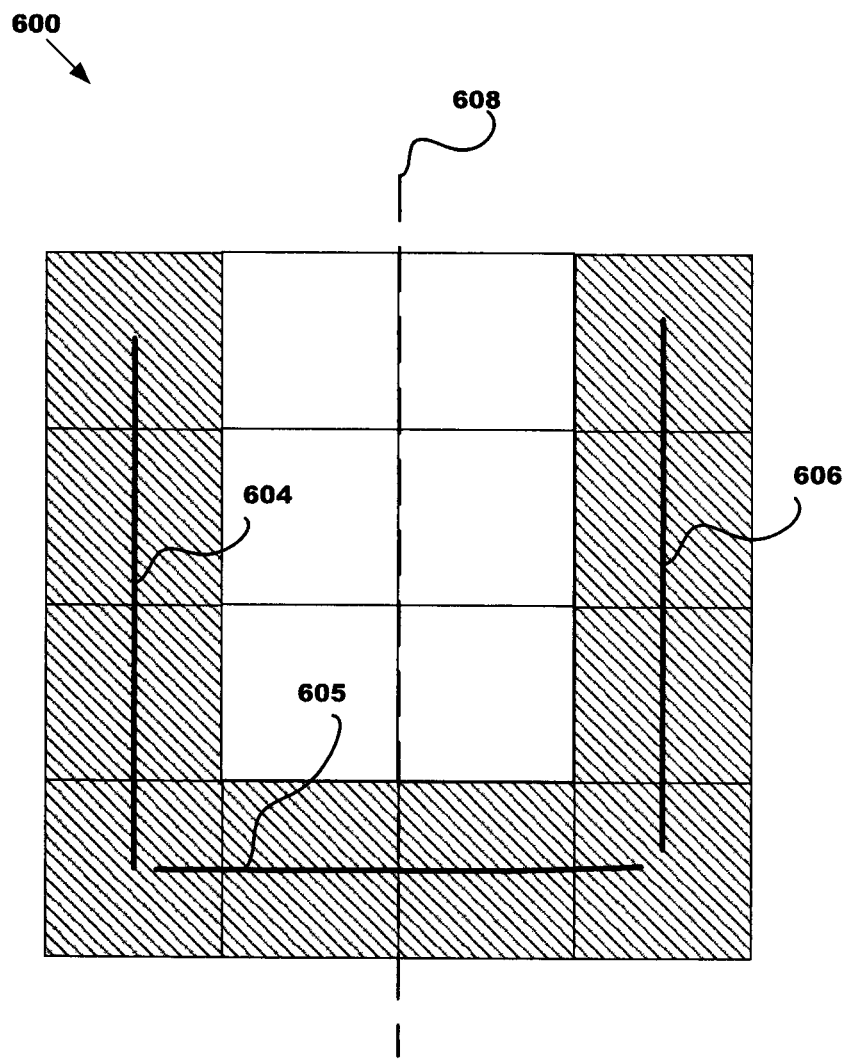
FIG. 6 shows an example symmetric graphical password.

Referring now to FIG. 5, FIG. 5 is a flow chart illustrating a process 500 that may be performed by apparatus 100 in some embodiments. Process 500 may begin in step 502, where apparatus 100 applies a first operation on at least a first segment of the graphical password to produce at least a first transformed segment. For example, FIG. 6 shows a user selected pattern 600, which is in the shape of a U. In step 502, a first segment of the U shaped pattern, such as line 604, may be reflected along line 608 thereby forming the first transformed segment.

In step 504, apparatus 100 performs a comparison operation between the first transformed segment and a second segment of the graphical password. For example, apparatus 100 may determine whether the first transformed segment is "similar" to and/or "identical" to a second segment of the graphical password. Apparatus 100 may determine that the first transformed segment is "similar" to the second segment of the graphical password if the first transformed segment resembles the second segment in appearance or character without being identical. For example, the first transformed segment may be considered similar to the second segment if the degree to which they are the same exceeds a predetermined threshold (e.g., 10% or higher). For instance, a first transformed segment may be deemed "similar" to a second segment if, for example, 75% of the grid points belonging to the first transformed segment are also part of the second segment. Apparatus 100 may determine that the first transformed segment is "identical" to the second segment of the graphical password if the first transformed segment and the second segment are exactly alike (i.e. 100% agreement). In the example shown in FIG. 6, the first transformed segment (i.e., line 604 reflected or folded along line 608) is identical to line 606 corresponding to the second segment.

In step 506, apparatus 100 performs a penalty operation with respect to the first segment in step 506 based on an outcome of step 504. For example, if apparatus 100 determines that the first transformed segment is neither similar nor identical to the second segment of the graphical password, then apparatus 100 may perform a null operation or may set a penalty value (PV) equal to 1 (step 512). On the other hand, if apparatus 100 determines that first transformed segment is either similar or identical to the second segment of the graphical password, then apparatus 100 may perform one or more of steps 508 and 510.

In step 508, apparatus 100 calculates or selects a penalty value (PV), wherein the penalty value may be used in calculating the value representing the strength of the graphical password. For example, in some embodiments, process 500 may be performed between steps 309 and 310 of process 300 to reduce, if necessary, the "b" value determined by performing step 309. For example, after step 309 is performed, thereby producing a "b" value for the graphical password, process 500 may be performed and PV may be set to some value less than one if the first transformed segment is identical/similar to the second segment and then b may be set equal to (b)(PV), thereby producing a reduced "b" value in the case that the first transformed segment is identical/similar to the second segment. Equivalently, PV may be set to some value greater than one if the first transformed segment is identical/similar to the second segment and then b may be set equal to (b)/(PV), thereby producing a reduced "b" value in the case that the first transformed segment is identical/similar to the second segment. Penalties may also be "additive" rather than multiplicative. For example, the value of b may be reduced by subtracting PV so that B is set to b−PV or b+PV (if PV itself is negative).

Figure 7:
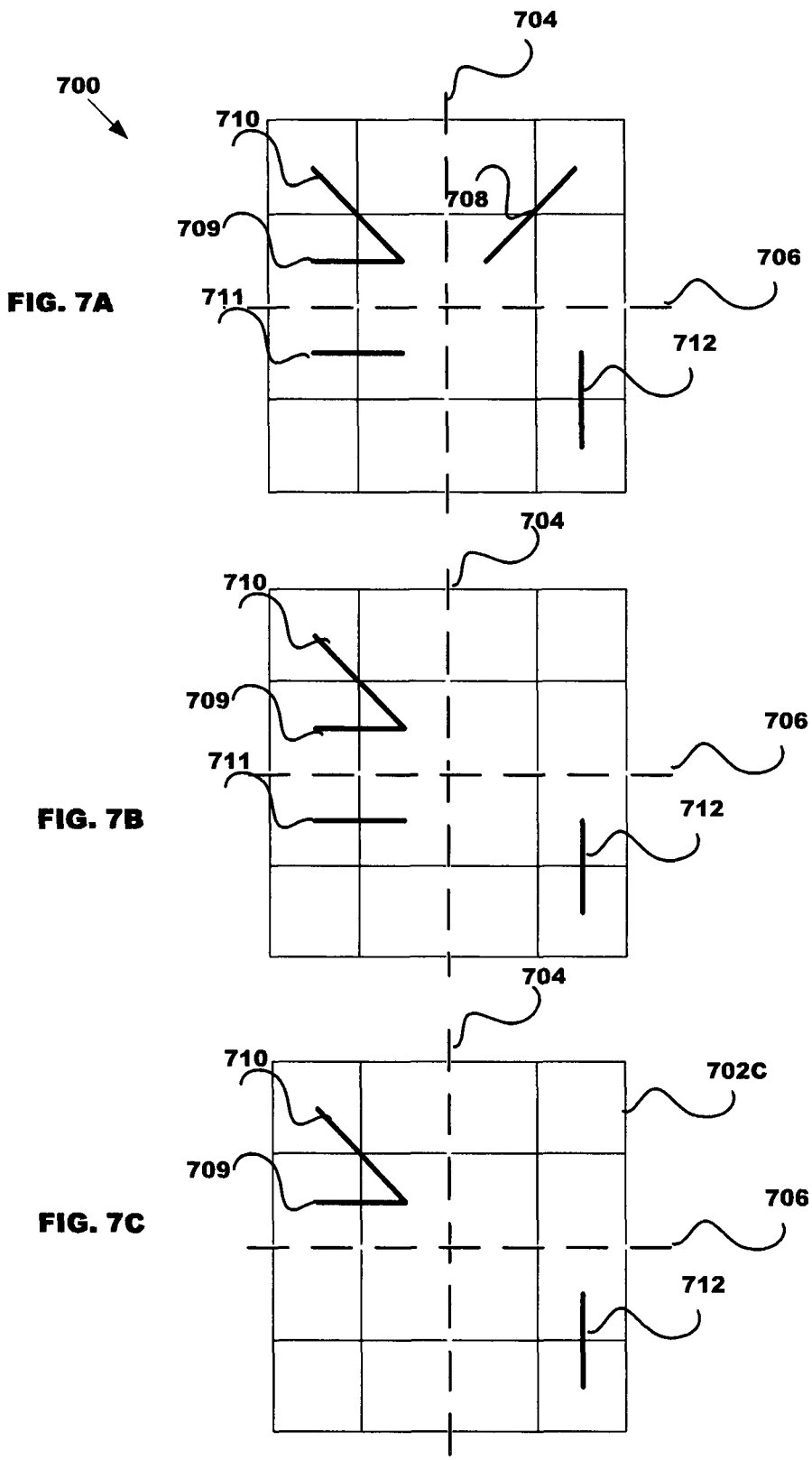
FIG. 7 shows examples of operations to produce transformed segments.

In step 510, apparatus 100 disregards the first or the second segment in calculating the value representing the strength of the graphical password (e.g., prior to performing process 300). This feature is graphically illustrated in FIGS. 7A, 7B and 7C. FIG. 7 shows a graphical password 700 that consists of segments 708-712. The first time process 500 is performed, segment 708 may be the "first" segment that gets transformed. If we assume that segment 708 is reflected along line 704, then the first transformed segment will be identical to segment 710 (the "second segment"). Thus, when estimating the strength of password 700, segment 708 may be disregarded. For example, the disregarded segment may be "removed" from the graphical password as show in inFIG. 7B. The next time process 500 is performed, segment 711 may be the "first" segment that gets transformed. If we assume that segment 711 is reflected along line 706, then the first transformed segment will be identical to segment 709 (the "second segment"). Thus, when estimating the strength of password 700, segment 711 may also be disregarded (e.g., ignored or removed from the password as shown in FIG. 7C. Thus, the strength of password 700 will be determined based on the pattern shown in FIG. 7C, as opposed to the pattern shown in FIG. 7A. The rationale for this approach is that symmetrically arranged segments should only be counted once as contributing to the strength of the password.

Figure 8:
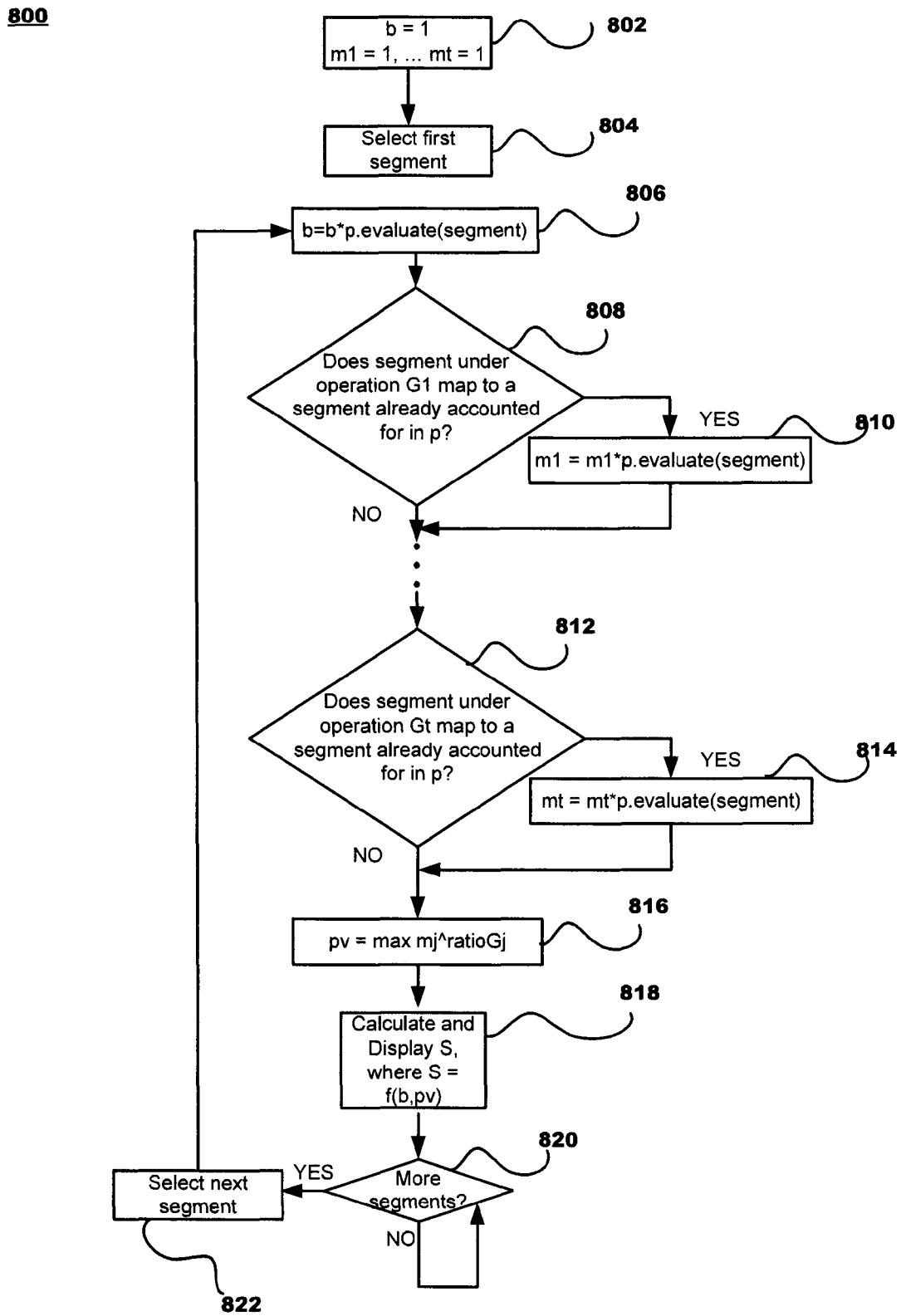
FIG. 8 is a flow chart illustrating a process for estimating the strength of a graphical password.

Referring now to FIG. 8, FIG. 8 is a flow chart illustrating a process 800 for estimating the strength of a graphical password that may be performed by apparatus 100 in some embodiments. Process 800 may begin with step 802, where apparatus 100 initiates process 800. In step 802, process 800 may seta variable, b, to represent the strength of a graphical password. Process 800 may also set each evaluation function value, m1 . . . mt, to 1 in step 802.

In step 804, the first segment of the user created graphical password is selected.

As shown in FIG. 8, process 800 may calculate a new value for b in step 806 based on an evaluation of the probability of the selected segment. This evaluation may be similar to step 308 in FIG. 3.

In step 808, process 800 performs an operation G1 to transform the selected segment to produce a transformed segment. For example, to produce the transformed segment, operation G1 may: reflect the selected segment with respect to a predetermined line or point; rotate the selected segment by an angle with respect to a predetermined point; scale the selected segment; translate the selected segment by a predetermined distance in a predetermined direction; or perform some other transformation operation.

In step 808, it is determined whether the transformed segment matches any segment of the user created pattern other than the selected segment. For example, in some embodiments a comparison operation may be performed to determine if the transformed segment is identical to some other selected segment of the user created pattern, e.g., the transformed segment is identical to the other selected segment. In some embodiments, a comparison operation may be performed to determine if the transformed segment is similar to the other selected segment of the user created pattern, e.g., the transformed segment and the other selected segment are at least 10% identical or, in other embodiments, at least 50% identical. If process 800 determines that the transformed segment matches a segment of the user created pattern, then process 800 may calculate a new m1 based on the previous m1 and a probability related value associated with the selected segment (step 810).

Whether the process 800 determines that the selected segment does or does not transform to another segment, the process continues from either step 808 or step 810, based on the determination, to a similar determination. This determination, as shown in FIG. 8, may include a determination based on another operation (e.g., a transformation on the selected segment) until in step 812 the last transformation operation, operation Gt, t=2, 3, . . . , is applied to the selected segment to produce a new transformed segment and a determination is made as to whether the newly transformed segment matches an already existing segment of the user created pattern. If the comparison operation in step 812 provides a positive result, process 800 may calculate a new mt based on the previous mt and a probability related value associated with the selected segment (814).

Whether the process 800 determines that the segment does or does not transform to another segment using operation Gt, the process may continue from either 812 or 814 to calculate a penalty value (pv) in step 816. In some embodiments, the pv may be calculated using the maximum product of the evaluation functions for all moves taken to the power of the ratio between segments:

$$pv = \max m_j^{ratioGj}$$

where j corresponds to the evaluation function value and the transformation operation with the highest calculated penalty value of each separately calculated penalty value. As provided in this example, the segments under an operation have correspondents in the original graphical password as compared to all the segments in the graphical password.

After step 816, process 800 may proceed to step 818, where a value S is determined and displayed (or otherwise indicated to) the user, where S represents the estimated strength of the as yet user created graphical password. S may be a function of b and pv (e.g., S=f(b,pv)). That is, step 818 corresponds to steps 310 and 312 described above and shown in FIG. 3. In step 820, process 800 determines whether there are any segments of the graphical password that have not yet been processed and, if so, selects the next segment to process (step 822). After step 822, process 800 proceeds back to step 806.

It should be noted that there are other symmetry concepts than the aforementioned geometric definitions based on reflections, rotations, etc. As is well-known in the art, a graph consists of a number of vertices (or points), V, and a set of edges, E, where each edge connects some pair of vertices in V, e.g. if u and v are vertices there may be an edge denoted (u,v). One may now view the user-selected graphical pattern as a graph where vertices correspond to the user-selected points (e.g. grid points) and edges correspond to pairs of adjacently selected points. (In the case that the pattern consists of more than one stroke, one could consider each stroke as a sub-graph.) Interpreting patterns as (sets of) graphs enables one to use other concepts of symmetry as discussed next.

Two graphs A=(V, E) and B=(V', E') are said to be isomorphic if it is possible to find a (bijective) mapping function, f, of the vertices V onto the vertices V' such that the mapping preserves the edges. I.e. for all vertices x, y of V and all vertices x', y' of V', with f(x)=x' and f(y)=y', then (x, y) is an edge of E if, and only if, (x', y') is an edge in E'. An isomorphism of a graph A onto itself (i.e. B=A) is called an automorphism. Clearly, no t-vertex graph can have more than t! (the factorial of t) automorphisms. In general graphs may have some number "n" of automorphisms, 1<=n<=t! The more symmetric the graph is, the larger the automorphism group should be. One approach is therefore to compute the number of automorphisms and use that as a measure of pattern complexity: the larger this number, the more symmetry, and the smaller the pattern complexity. Or, alternatively, we compute a penalty value, PVa, based on the number of automorphisms. The value PVa may be used alone and/or be combined with the previously described penalty values based on e.g. rotational or reflectional symmetries, etc.

Figure 9:
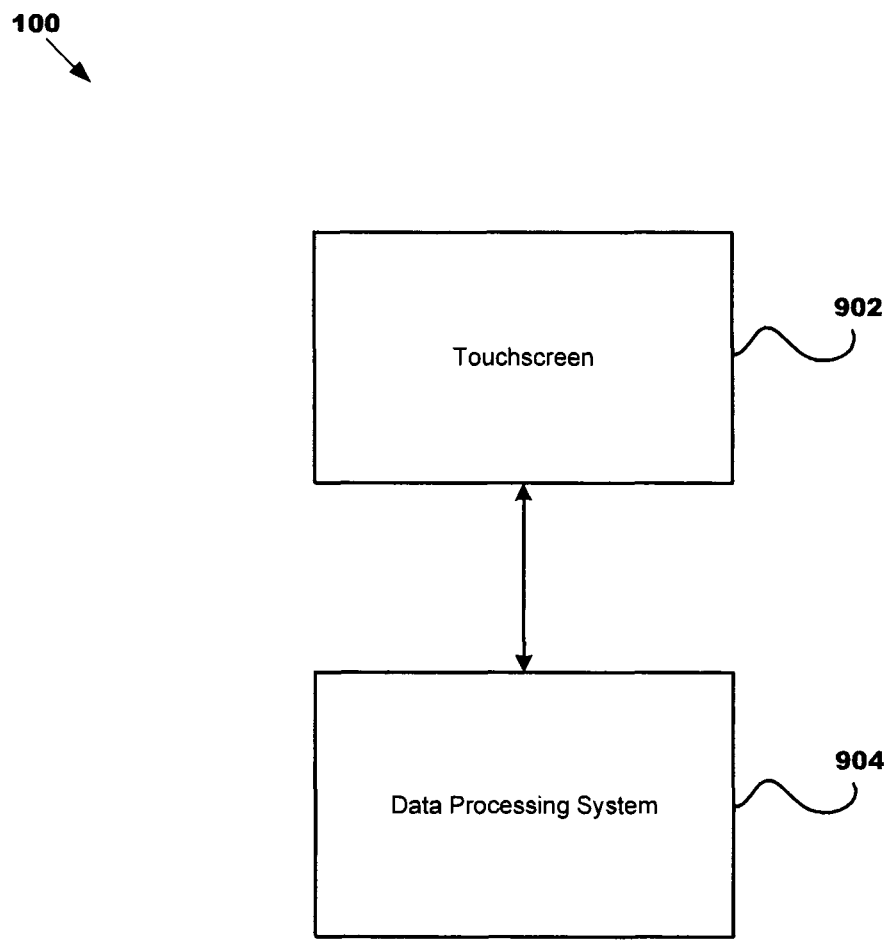
FIG. 9 is a block diagram illustrating an example apparatus for determining strength of a graphical password.

Referring now to FIG. 9, FIG. 9 is a block diagram further illustrating apparatus 100 according to some embodiments. As shown in FIG. 9, apparatus 100, according to some, but not every, embodiment, may include a touchscreen 902 for displaying graphical object 102 and a data processing system 904 for estimating the strength of a graphical password that is created by a user by, for example, interacting with touchscreen 902 and for providing feedback to the user (see e.g., strength status bar 199 show in FIG. 1). That is, data processing system 904 may perform the processes to estimate the strength of a graphical password as disclosed, including process 300, process 500, and process 800. In some embodiments, data processing system 904 and touchscreen 902 are part of the same device (e.g., smartphone). In other embodiments, data processing system 904 is located remotely from touchscreen 902. Additionally, as discussed above, apparatus may not include a touchscreen and the user may interact with the graphical object 102 using an input device other than a touchscreen, such as, for example, a mouse, a joystick, a wand, a remote control, a microphone for receiving voice commands, a camera that tracks the user's eye movements, etc.

Figure 10:
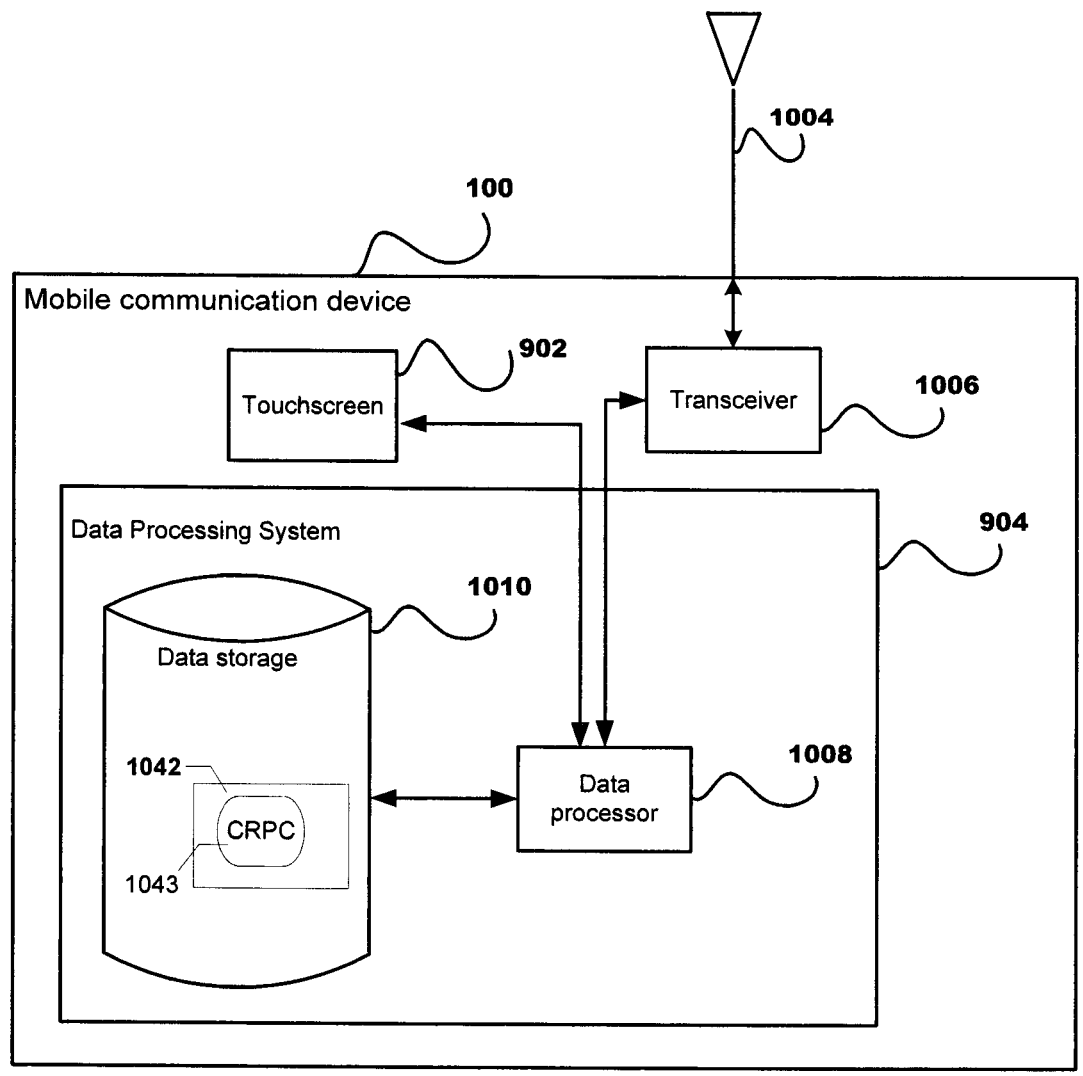
FIG. 10 is a block diagram of a particular embodiment of a system or components thereof for determining strength of a graphical password.

Referring now to FIG. 10, FIG. 10 illustrates an exemplary block diagram of apparatus 100, according to embodiments where apparatus 100 is a mobile communication device (e.g., smartphone, tablet, or laptop). The apparatus 100 in FIG. 10 includes touchscreen 902; data processing system 904; transceiver 1006 and antenna 1004. As shown in FIG. 10, data processing system 904 may include a data processor 1008, such as one or more microprocessors and/or one or more circuits, such as an application specific integrated circuit (ASIC), Field-programmable gate arrays (FPGAs), etc.; data storage 1010, which may include one or more non-volatile storage devices and/or one or more volatile storage devices (e.g., random access memory (RAM)). In embodiments where data processor 1008 includes a microprocessor, a computer program product is provided, which computer program product includes: computer readable program code 1043 (software), which implements a computer program, stored on a computer readable medium 1042, such as, but not limited, to magnetic media (e.g., a hard disk), optical media (e.g., a DVD), memory devices (e.g., random access memory), etc. In some embodiments, computer readable program code 1043 is configured such that, when executed by data processor 1008, code 1043 causes the processor 1008 to perform the steps described herein (e.g., one or more steps shown in the flowcharts shown in FIGS. 3, 5, and 8), In other embodiments, the apparatus 100 is configured to perform steps described above without the need for code. That is, for example, data processor 1008 may consist merely of one or more ASICs. Hence, the features of the present invention described above may be implemented in hardware and/or software.

The invention claimed is:
1. A computer-implemented method for estimating a strength of a proposed graphical password comprising a first segment and a second segment, the method comprising:
 (a) a hardware processor obtaining the proposed graphical password, wherein the proposed graphical password was created by a user interacting with a touch-screen of a mobile communication device, and applying a first geometric operation on the first segment of the proposed graphical password, wherein the first segment consists of a first set of two or more points (P11, P12, . . . ) and applying the first geometric operation on the first segment of the proposed graphical password results in the generation of a first transformed segment of the proposed graphical password, wherein the first transformed segment consists of a corresponding second set of two or more points (P21, P22, . . . ), each point in the first set of points is mapped to a point in the second set of points based on the geometric operation, and the first set of points includes a first point (P11) that is mapped to a second point (P21) included in the second set of points and the first point (P11) is located at a first position and the second point (P21) is located at a second position that is different than the first position;
 (b) the hardware processor performing a comparison operation between 1) the first transformed segment that was generated by applying the geometric operation on the first segment of the proposed graphical password and 2) the second segment of the proposed graphical password, wherein the second segment of the proposed graphical password is separate and distinct from the first segment of the proposed graphical password;
 (c) based on an outcome of the comparison operation, the processor hardware performing a penalty operation with respect to the first segment, wherein the step of performing the penalty operation comprises one or more of:
 (c1) the hardware processor calculating a penalty value, wherein the penalty value is used in calculating a value representing the strength of the proposed graphical password; and
 (c2) the hardware processor disregarding the first or the second segment when calculating the value representing the strength of the proposed graphical password, wherein the step of applying the first geometric operation on the first segment of the proposed graphical password comprises the processor rotating the first segment of the proposed graphical password around a first point by X degrees, where X>0 and X<360 degrees.

2. The computer-implemented method of claim 1, wherein
the step of performing the comparison operation comprises the processor determining whether the first transformed segment is similar to the second segment, and
the step of performing the penalty operation is performed in response to a determination that the first transformed segment is similar to the second segment.

3. The method of claim 2, wherein
the step of determining whether the first transformed segment is similar to the second segment comprises the processor determining whether the first transformed segment is identical to the second segment, and
the step of performing the penalty operation is performed in response to a determination that the first transformed segment is identical to the second segment.

4. The computer-implemented method of claim 1, wherein
the first segment of the proposed graphical password is a first point, the first point having a first coordinate,
the second segment of the proposed graphical password is a second point, the second point having a second coordinate,
the first transformed segment comprises a first transformed point having a third coordinate, and
step (b) comprises determining whether the third coordinate is the same as the second coordinate.

5. The computer-implemented method of claim 1, wherein
the first segment of the proposed graphical password comprises an ordered set of points P1, P2, P3, Pn,
the method further comprises the processor determining a value representing a strength of the first segment, which determining step comprises, for each point included in the ordered set of points, the processor determining a probability related value associated with the point based on a first probability distribution, and
the value representing the strength of the first segment is a function of the determined probability related values.

6. The computer-implemented method of claim 5, wherein
the step of determining the value representing the strength of the first segment further comprises:
the processor determining whether points P1, P2 and P3 all lie on the same straight line, and
the processor assessing a penalty in response to determining that points P1, P2 and P3 all lie on the same straight line.

7. The computer-implemented method of claim 1, further comprising:
(d) the processor applying a second operation on the first segment of the proposed graphical password to produce a second transformed segment;
(e) the processor performing a comparison operation between the second transformed segment and a third segment of the proposed graphical password;
(f) based on an outcome of the comparison operation between the second transformed segment and the third segment, the processor performing a penalty operation with respect to the first segment, wherein the step of performing the penalty operation comprises one or more of:

(f1) the processor calculating a penalty value, wherein the penalty value is used in calculating a value representing the strength of the proposed graphical password; and
(f2) the processor disregarding the first or the third segment from the proposed graphical password when calculating the value representing the strength of the proposed graphical password.

8. The computer-implemented method of claim 1, the method further comprising:
the processor displaying the strength of the proposed graphical password before the proposed graphical password is completed.

9. The computer-implemented method of claim 8, the method further comprising:
the processor updating the display of the proposed graphical password in response to receiving a next segment of the proposed graphical password.

10. The computer-implemented method of claim 9, wherein the penalty operation decreases the strength of the proposed graphical password in response to determining that the next segment and a prior consecutive segment have a same direction.

11. The computer-implemented method of claim 1, wherein each segment in the proposed graphical password is connected with another segment in the proposed graphical password.

12. An apparatus for estimating a strength of a proposed graphical password comprising two or more segments, the apparatus comprising:
a data processing system comprising one or more hardware processors, the data processing system being configured to employ one or more of the one or more hardware processors to being configured to perform a process comprising:
(a) obtaining the proposed graphical password, wherein the proposed graphical password was created by a user interacting with a touch-screen of a mobile communication device, and applying a first operation on a first segment of the proposed graphical password, wherein the first segment consists of a first set of two or more points (P11, P12, . . . ) and applying the first geometric operation on the first segment of the proposed graphical password results in the generation of a first transformed segment of the proposed graphical password, wherein the first transformed segment consists of a corresponding second set of two or more points (P21, P22, . . . ), each point in the first set of points is mapped to a point in the second set of points based on the geometric operation, and the first set of points includes a first point (P11) that is mapped to a second point (P21) included in the second set of points and the first point (P11) is located at a first position and the second point (P21) is located at a second position that is different than the first position;
(b) performing a comparison operation between the first transformed segment and a second segment of the proposed graphical password;
(c) based on an outcome of the comparison operation, performing a penalty operation with respect to the first segment, wherein the step of performing the penalty operation comprises one or more of:
(c1) calculating a penalty value, wherein the penalty value may be used in calculating a value representing the strength of the proposed graphical password; and
(c2) disregarding the first or the second segment when calculating the value representing the strength of the proposed graphical password, wherein the step of applying the operation on the first segment of the proposed graphical password comprises rotating the first segment around a first point by X degrees, wherein X>0 and X<360.

13. The apparatus of claim 12, wherein
the first segment of the proposed graphical password is a first point, the first point having a first coordinate,
the second segment of the proposed graphical password is a second point, the second point having a second coordinate,
the first transformed segment comprises a first transformed point having a third coordinate, and
step (b) comprises determining whether the third coordinate is the same as the second coordinate.

14. The apparatus of claim 12, wherein
the first segment of the proposed graphical password comprises a first line, the first line extending from a first point having a first coordinate to a second point having a second coordinate,
the first transformed segment comprises a first transformed line extending from a third point having a third coordinate to a fourth point having a fourth coordinate, and
step (b) comprises determining whether the proposed graphical password includes a line that extends from the third point to the fourth point.

15. The apparatus of claim 12, wherein
the first segment of the proposed graphical password comprises an ordered set of points P1, P2, P3, . . . , Pn,
the process further comprises determining a value representing the strength of the first segment, which determining step comprises, for each point included in the ordered set of points, determining a probability related value associated with the point based on a first probability distribution, and
the value representing the strength of the first segment is a function of the determined probability related values.

16. The apparatus of claim 15, wherein
the step of determining the value representing the strength of the first segment further comprises:
determining whether points P1, P2 and P3 all lie on the same straight line, and
assessing a penalty in response to determining that points P1, P2 and P3 all lie on the same straight line.

17. The apparatus of claim 12, wherein the process further comprises:
(d) applying a second operation on the first segment of the proposed graphical password to produce a second transformed segment;
(e) performing a comparison operation between the second transformed segment and a third segment of the proposed graphical password;
(f) based on an outcome of the comparison operation between the second transformed segment and the third segment, performing a penalty operation with respect to the first segment, wherein the step of performing the penalty operation comprises one or more of:
(f1) calculating a penalty value, wherein the penalty value may be used in calculating a value representing the strength of the proposed graphical password; and
(f2) disregarding the first or the third segment when calculating the value representing the strength of the proposed graphical password.

18. The apparatus of claim 12, wherein the proposed graphical password is created by a user.

19. The apparatus of claim 18, wherein the input device is located remotely from the apparatus.

20. The apparatus of claim 12, wherein the proposed graphical password is received by the apparatus from an input device.

21. The apparatus of claim 20, wherein the input device comprises a touchscreen.

22. The apparatus of claim 20, wherein the input device is an input-output device and the process that the data processing system is configured to perform further comprises:
calculating a value representing the estimated strength of the proposed graphical password; and
using the input-output device to indicate to a user the estimated strength of the proposed graphical password.

23. A computer program product comprising a non-transitory computer readable medium storing computer code for estimating a strength of a proposed graphical password comprising two or more segments, the computer code comprising:
(a) instructions for applying a first operation on a first segment of the proposed graphical password, wherein the proposed graphical password was created by a user interacting with a touch-screen of a mobile communication device, and wherein the first segment consists of a first set of two or more points (P11, P12, . . . ) and applying the first geometric operation on the first segment of the proposed graphical password results in the generation of a first transformed segment of the proposed graphical password, wherein the first transformed segment consists of a corresponding second set of two or more points (P21, P22, . . . ), each point in the first set of points is mapped to a point in the second set of points based on the geometric operation, and the first set of points includes a first point (P11) that is mapped to a second point (P21) included in the second set of points and the first point (P11) is located at a first position and the second point (P21) is located at a second position that is different than the first position;
(b) instructions for performing a comparison operation between the first transformed segment and a second segment of the proposed graphical password;
(c) instructions for performing a penalty operation with respect to the first segment based on an outcome of the comparison operation, wherein the instructions for performing the penalty operation comprises one or more of:
(c1) instructions for calculating a penalty value, wherein the penalty value is used in calculating a value representing the strength of the proposed graphical password; and
(c2) instructions for disregarding the first or the second segment when calculating the value representing the strength of the proposed graphical password, wherein
the instructions for applying the operation on the first segment of the proposed graphical password comprises instructions for rotating the first segment around a first point by X degrees, where X>0 and X<360.

24. The computer program product of claim 23, wherein
the instructions for performing the comparison operation comprises instructions for determining whether the first transformed segment is similar to the second segment, and
the instructions for performing the penalty operation are configured to be executed in response to a determination that the first transformed segment is similar to the second segment.

25. The computer program product of claim 24, wherein the instructions for determining whether the first transformed segment is similar to the second segment comprises instructions for determining whether the first transformed segment is identical to the second segment, and
the instructions for performing the penalty operation are configured to be executed in response to a determination that the first transformed segment is identical to the second segment.

26. The computer program product of claim 23, wherein the first segment of the proposed graphical password is a first point, the first point having a first coordinate,
the second segment of the proposed graphical password is a second point, the second point having a second coordinate,
the first transformed segment comprises a first transformed point having a third coordinate, and
the instructions for performing the comparison operation comprises instructions for determining whether the third coordinate is the same as the second coordinate.

27. The computer program product of claim 23, wherein the first segment of the proposed graphical password comprises an ordered set of points P1, P2, P3, ..., Pn,
the computer code further comprises instructions for determining a value representing the strength of the first segment, which comprises, for each point included in the ordered set of points, instructions for determining a probability related value associated with the point based on a first probability distribution, and
the value representing the strength of the first segment is a function of the determined probability related values.

28. The computer program product of claim 27, wherein the instructions for determining the value representing the strength of the first segment further comprises:
instructions for determining whether points P1, P2 and P3 all lie on the same straight line, and
instructions for reducing the value representing the strength of the first segment in response to determining that points P1, P2 and P3 all lie on the same straight line.

29. The computer program product of claim 23, wherein the instructions for applying the operation on the first segment of the proposed graphical password comprises one or more of:
(i) instructions for rotating the first segment around a first point by X degrees, where X>0 or X<0, and
(ii) instructions for folding the first segment around a first specified axis.

* * * * *